(12) United States Patent
Mukhopadhyay et al.

(10) Patent No.: US 9,036,794 B2
(45) Date of Patent: May 19, 2015

(54) MESSAGING SYSTEM AND METHOD FOR PROVIDING INFORMATION TO A USER DEVICE

(75) Inventors: Amit Mukhopadhyay, Westfield, NJ (US); Carlos Urrutia-Valdes, Eatontown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2229 days.

(21) Appl. No.: 11/789,586

(22) Filed: Apr. 25, 2007

(65) Prior Publication Data

US 2008/0267366 A1 Oct. 30, 2008

(51) Int. Cl.
*H04M 11/00* (2006.01)
*H04M 3/53* (2006.01)
*H04M 7/00* (2006.01)

(52) U.S. Cl.
CPC .......... *H04M 3/5307* (2013.01); *H04M 7/0036* (2013.01); *H04M 2201/40* (2013.01); *H04M 2201/60* (2013.01)

(58) Field of Classification Search
CPC ............................ H04M 3/537; H04M 3/533
USPC ....................... 379/88.12, 88.16, 88.19, 88.14
See application file for complete search history.

(56) References Cited

U.S. PATENT DOCUMENTS

| | | | |
|---|---|---|---|
| 6,061,719 A | 5/2000 | Bendinelli et al. | |
| 6,570,964 B1 | 5/2003 | Murveit et al. | |
| 2003/0002635 A1* | 1/2003 | Koch et al. | 379/88.17 |
| 2003/0048881 A1* | 3/2003 | Trajkovic et al. | 379/88.12 |
| 2003/0063717 A1 | 4/2003 | Holmes | |
| 2005/0063521 A1* | 3/2005 | Shah | 379/88.01 |
| 2005/0276395 A1 | 12/2005 | Schultz et al. | |
| 2008/0059170 A1* | 3/2008 | Bloebaum et al. | 704/233 |
| 2008/0091443 A1* | 4/2008 | Strope et al. | 705/1 |

FOREIGN PATENT DOCUMENTS

| | | |
|---|---|---|
| GB | 2 373 670 | 9/2002 |
| JP | 06-034358 | 5/1994 |
| JP | 2005-503077 | 1/2005 |
| WO | WO 03/024073 | 3/2003 |

OTHER PUBLICATIONS

International Search Report and Written Opinion dated Aug. 14, 2008.
Japanese Office Action dated Dec. 8, 2011 for Application No. 2010-506219 and English translation thereof.
Office Action for corresponding Japanese Application No. 2010-506219 dated Sep. 20, 2012 and English translation thereof.

* cited by examiner

Primary Examiner — Simon King
(74) Attorney, Agent, or Firm — Harness, Dickey & Pierce

(57) ABSTRACT

Disclosed is a messaging system that provides additional information to a user device after determining the content of at least some of a message. The messaging system includes a speech to X conversion module which retrieves the additional information based on the content. An input-output module then transmits the message and the additional information to the user device.

20 Claims, 4 Drawing Sheets

MESSAGING SYSTEM AND METHOD FOR PROVIDING INFORMATION TO A USER DEVICE

BACKGROUND OF THE INVENTION

The present invention relates generally to telephony, and more specifically to messaging systems.

Fundamentally, messaging systems, such as voice mail systems, have not changed from when they were initially introduced to consumers. Calling parties leave voice messages on a messaging system and called parties retrieve the messages at convenient times. Recently, messaging systems have implemented speech-to-text and text-to-speech conversions. A system utilizing speech-to-text conversion allows a called party to retrieve a message as text, where the message was originally left in voice form. For example, a called party may access a web page to retrieve a message converted from speech to text. A called party may also receive an email having the text corresponding to the message originally left in voice form. A system utilizing text-to-speech conversion allows a called party to retrieve an audio message, where the message was originally left as text. For example, a called party may use a telephone to retrieve the audio message.

Existing messaging systems may be viewed as passive in nature. A passive messaging system is a messaging system that does not perform actions based on the contents of the message, but instead only enables a called party to access messages. For example, if a calling party leaves a voice mail message indicating that the called party should review several web pages, the called party may need to listen to the voice mail message several times in order to write down the web site locations, e.g., the Uniform Resource Locators, or URLs. The called party may then retrieve the web pages before calling the calling party back. Further, if the called party does not know the calling party's contact information, the called party either has to write down the calling party's telephone number if the number was stated during the message or retrieve the calling party's contact information, such as from an address book, personal digital assistant (PDA), white pages, or yellow pages.

BRIEF SUMMARY OF THE INVENTION

The problem with passive messaging systems is that the called party typically has to perform one or more additional steps either during or subsequent to listening to a message. These additional steps may be time consuming and/or burdensome for the called party. There remains a need to enhance messaging systems to perform actions based on the contents of the message itself.

In accordance with the principles of the present invention, a messaging system provides information to a user device based on the content of at least a portion of a stored voice message after determining the content of the at least a portion of the stored message. The messaging system includes a speech to X conversion module which retrieves the additional information based on the content. The speech to X conversion module converts at least a portion of the message to another format, also referred to herein as an X format, so that the additional information can be displayed or played on the user device. An input-output module then transmits the original voice message and the additional information to the user device.

The content of a message, or portion of a message, is information contained therein. The content may include a uniform resource locator (URL), a physical address, a location, a company name, an individual name, and/or a telephone number. The additional information that is retrieved is information associated with the content of the message. The additional information may include a map, contact information such as a telephone number, a web page, a URL, a location, an address, a picture, a photograph, and/or a video. For example, suppose the stored message contains directions to company Z. The messaging system may determine that the contents of the message include directions to company Z and may retrieve additional information which includes a map to travel to company Z. Further, the additional information retrieved may also include one or more of a photograph of a location or plant of company Z, a URL to company Z's web page, company Z's web page, its address, telephone number, etc.

In one embodiment, the messaging system transmits the message and additional information to a user device, such as a user device associated with the called party. The messaging may also determine the capabilities of the user device before transmitting the message and the additional information. The messaging system may use its determination of the capabilities of the user device to adjust how and what is transmitted to the user device. For example, the messaging system may determine that the user device is a personal digital assistant (PDA) that downloads information such as web pages at a predetermined rate. As a result, the messaging system may transmit only URLs to the PDA instead of the entire web page in order to speed up the transmission of the additional information. Furthermore, the messaging system may also check user preferences in order to determine how and/or whether to transmit the additional information along with the message to the user device.

Furthermore, the message and additional information may be configured so that the additional information is utilized by the user device at a predetermined time. The predetermined time may be related to the content of the message. For example, at the point in a message at which a web site is introduced, the URL associated with the web site may be displayed on the user device.

The messaging system may receive the message from a calling party and may then convert the message into a predetermined format that is recognized by the messaging system. For example, the messaging system may convert an audio message into text. The messaging system may then search the text for keywords in order to determine what additional information to retrieve. The messaging system may then convert the text into multimedia or executable logic, such as HTML or Java applet(s), and store this multimedia or executable logic with the original message. In one embodiment, the multimedia or executable logic includes the original message and the additional information associated with the content of the original message. The messaging system then transmits the multimedia or executable logic to the user device.

DETAILED DESCRIPTION

Figure 1:
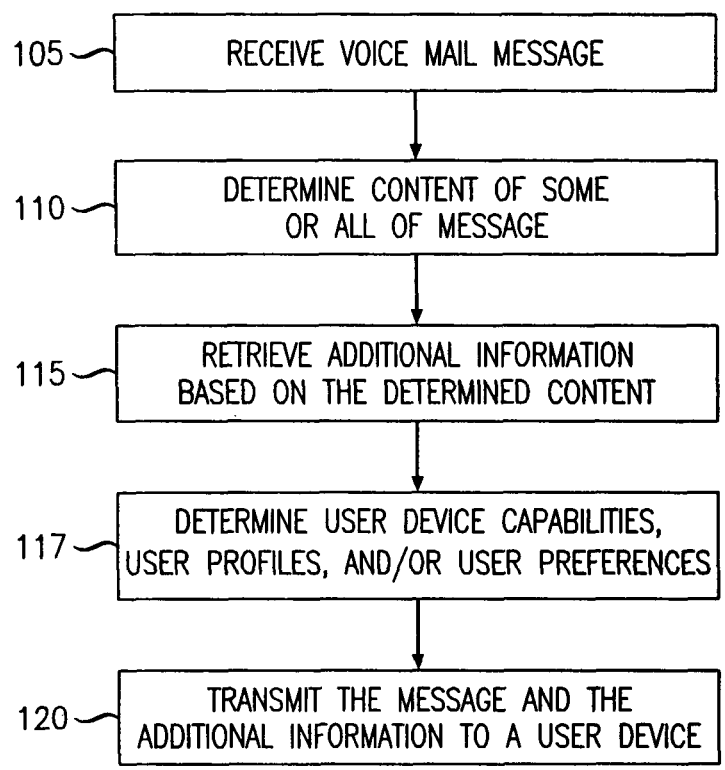
FIG. 1 is a flowchart illustrating the steps performed by a messaging system in accordance with an embodiment of the present invention.

In accordance with an aspect of the present invention, an active messaging system performs one or more actions that are associated with the contents of a voice mail message left by a calling party. FIG. 1 is a flowchart illustrating the steps performed by the messaging system in accordance with an embodiment of the present invention. The messaging system receives a voice mail message in step 105, for example from a calling party to the messaging system. The message may be an audio message, a text-based message, or a message having another format. The messaging system stores the message when the calling party leaves the message.

The messaging system then determines, in step 110, the content of some or all of the message. The content of the message may include a physical address, such as of a residence, a location, a Uniform Resource Locator (URL) of a web page, a company name, an individual's name, a telephone number, etc. In one embodiment, the messaging system determines the content by searching for keywords in the message. Examples of keywords include "www", "address", "web page", etc.

The messaging system then retrieves additional information that is related to or based on the determined content in step 115. The additional information may help the user and may prevent the user from searching for or obtaining the information after the user has listened to or seen the message. The additional information may include a map, contact information, a URL, a web page, a location, an address, a picture, a photograph, and/or a video.

The messaging system then determines user device capabilities, user profiles, and/or user preferences in step 117. This determination may affect how the message and additional information is transmitted. For example, if the messaging system determines that the user device is a traditional voice-only device, the messaging system does not transmit the additional information because a traditional voice-only device will not be able to process or display the additional information. Further, if the messaging system determines that the user device is a personal digital assistant (PDA), the messaging system may transmit URL links as the additional information rather than an entire web page in order to speed up the transmission of the message with the additional information.

With respect to determining user profiles, a user may specify that the additional information should only be URL links and should never be entire web pages. The messaging system follows the user profile, user preferences, and/or user device capabilities and transmits the message and the additional information to the user device in step 120.

As an example of some of the steps shown in FIG. 1, suppose a person A leaves a message for person B. In the message, person A tells person B to call person C. The messaging system may analyze the content of the message so that, when person B retrieves the message, person B's user device displays a button to call person C when the message is over. Person B does not have to go to his or her contacts or address book or white pages, find person C's telephone number, and then dial person C's number. Instead, person B only has to press the button after the message is over and person B's user device automatically calls person C at the telephone number listed for person C in person B's contacts.

Figure 2:
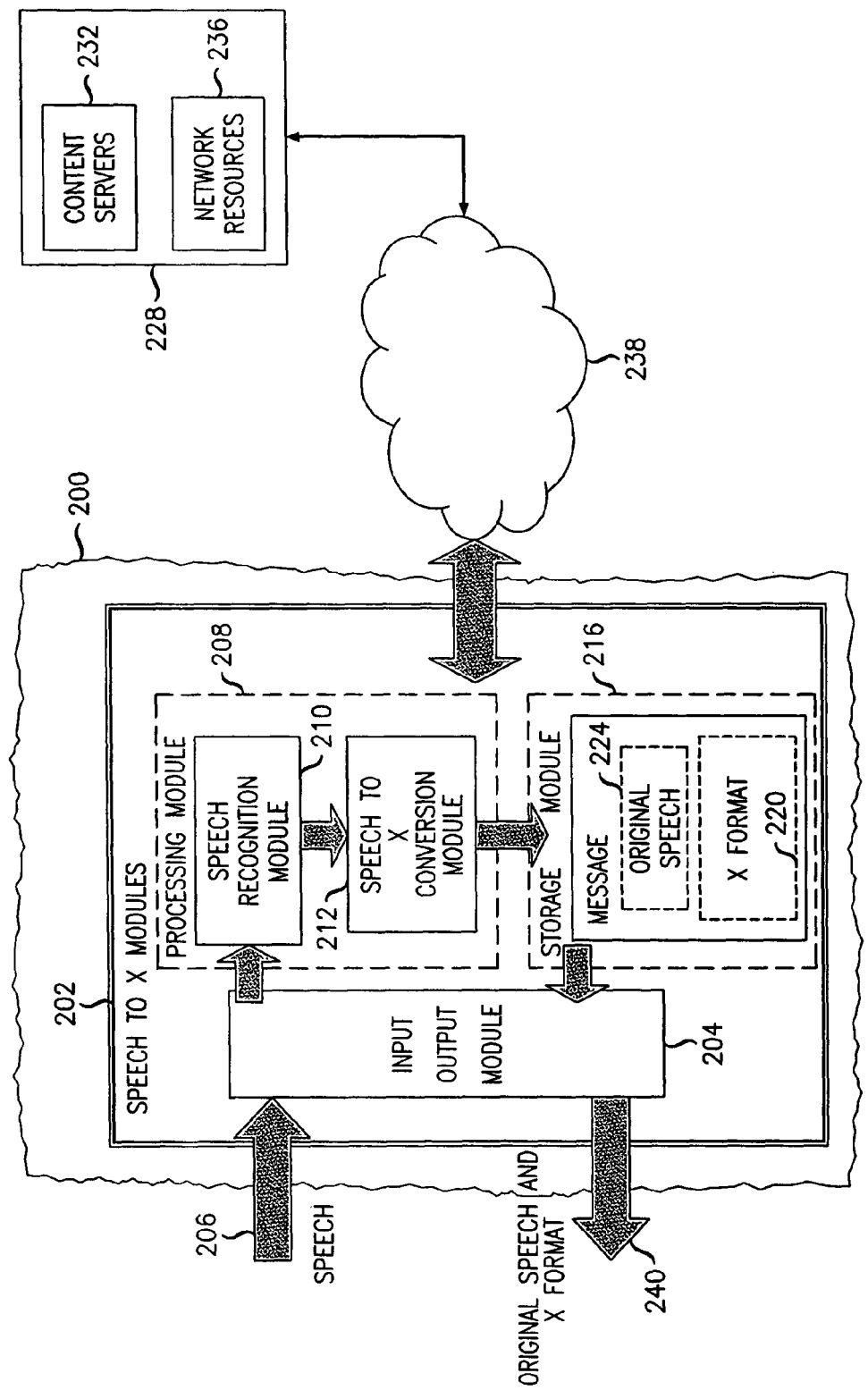
FIG. 2 is a block diagram of a messaging system in accordance with an embodiment of the present invention.

FIG. 2 is a block diagram of a messaging system 200 having one or more speech to X modules 202 in accordance with an embodiment of the present invention. A speech to X module 202 is a module that converts a message into another format—the X format. The X format is a format that is recognized by the user device. In one embodiment, the user, or called party, selects a format for the X format from many possible formats. Alternatively, the messaging system 200 determines the appropriate X format to use for the user device based on the user device's capabilities.

The speech to X module 202 includes an input-output (I/O) module 204. The I/O module 204 interacts with a user of the messaging system 200 or a module, such as another server, to receive speech 206 or text and/or to send the specified output to the corresponding recipient.

The speech to X module 202 also includes a processing module 208. The processing module 208 includes a speech recognition module (SRM) 210. The SRM 210 is responsible for converting the speech 206 to a recognizable format, such as text, to be used as input to a speech to X conversion module (SXCM) 212.

The SXCM 212 receives the converted message and analyzes the contents of the converted message to determine what additional content to retrieve. The SXCM 212 may then retrieve the additional content. For example, the SXCM 212 may determine, from the message, that the contents of the message include one or more references to a web page. In one embodiment, the SXCM 212 then converts at least a portion of the message into the X format to be stored with the original message, for example speech 206. For example, the SXCM 212 converts at least a portion of the message into multimedia or executable logic, such as HTML or Java applet(s). The messaging system 200 inserts URLs associated with the referenced web page in the multimedia/executable logic. In one embodiment, the locations at which URLs are inserted correspond with the locations of the message at which the web page is referenced. When this multimedia/executable logic is later transmitted to, and executed by, a user device, such as a computer, a personal digital assistant, a web telephone, etc., the user device can either show the URL link in conjunction with the playing or displaying of the message, such as at the time that the URL reference is made in the message, or can download the web page associated with the referred URL, such as at the time that the URL is mentioned in the message.

In one embodiment, the SXCM 212 transmits its output to a storage module (SM) 216. The storage module 216 stores the multimedia/executable logic 220 and the original speech 224, such as for later retrieval. The storage module, as well as any of the other modules described herein, may be internal to the speech to X module 202/messaging system 200 or may be external to and in communication with the speech to X module 202/messaging system 200.

The messaging system 200 may also include supporting module 228 that communicates with the speech to X module 202. The supporting module 228 is one or more modules that the speech to X module 202 uses to obtain the additional information. The supporting module 228 may be a module inside the messaging system 200 and/or speech to X module 202 or may be a module outside of and in communication with the messaging system 200 and/or speech to X module 202.

For example, the supporting module 228 may include one or more external content servers 232 and/or network resources 236. The content servers 232 may include one or more databases that store web pages, maps, contact information, pictures, photographs, videos, XML documents, etc. The network resources 236 may include one or more databases that store, for example, user preferences, network policies, user profiles such as identifiers, devices, subscriptions, etc., and/or presence or location information. In one embodiment, the messaging system 200 communicates with the supporting module 228 over a network 238, such as the Internet.

In another embodiment, the supporting module 228 includes one or more databases internal to the messaging system 200 and/or speech to X module 202.

The prior description describes embodiments of the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. For example, the processing module 208 may be a processor which controls the overall operation of the speech to X module 202 by executing computer program instructions which define such operation. The computer program instructions may be stored in the storage module 216 and loaded into a memory when execution of the computer program instructions is desired. As described above, the speech to X module 202 may also include one or more interfaces for communicating with other devices, such as locally or via a network. One skilled in the art will recognize that an implementation of an actual computer will contain other components as well, and that FIG. 2 is a high level representation of some of the components of such a computer for illustrative purposes.

Figure 3:
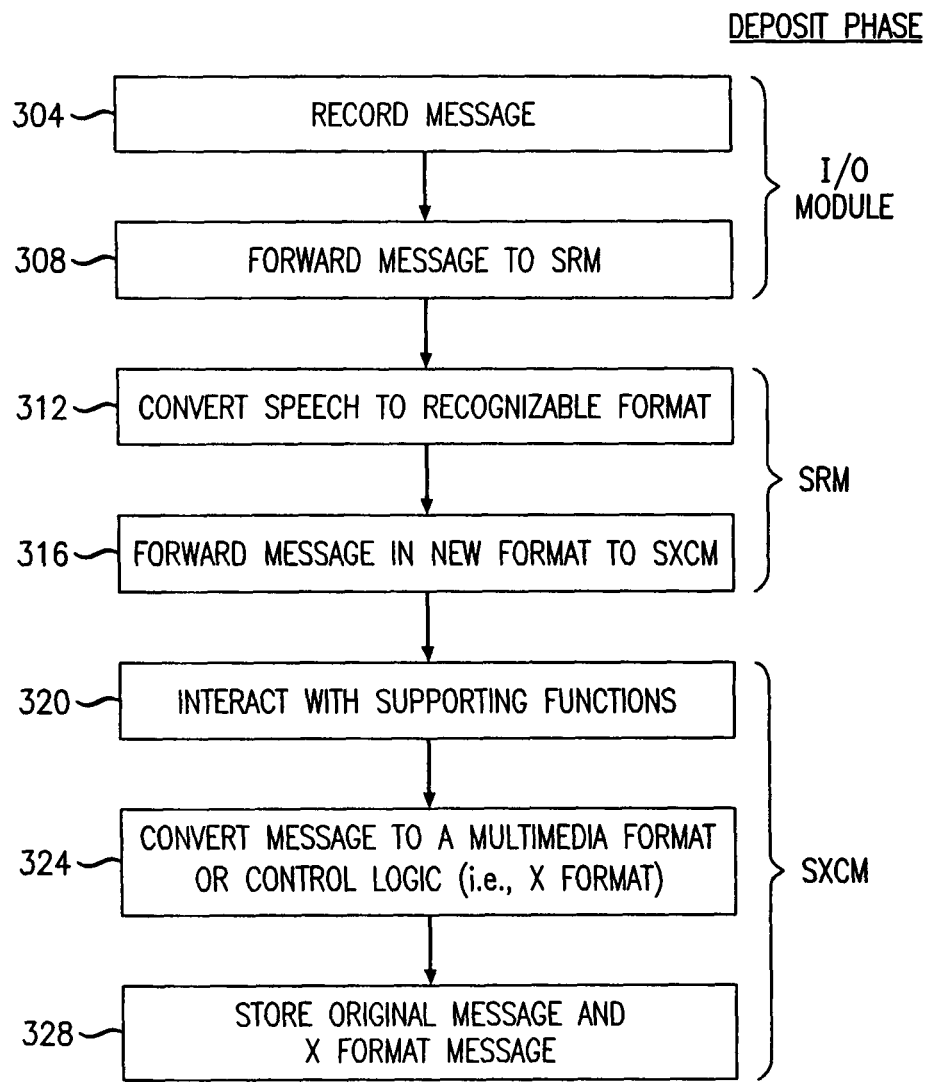
FIG. 3 is a flowchart illustrating the steps performed during a message deposit phase by a messaging system in accordance with an embodiment of the present invention.

FIG. 3 is a more detailed flowchart showing the steps performed by the speech to X module 202 of FIG. 2 when a caller is leaving a voice mail message for a called party, i.e., the Deposit Phase.

Suppose Party A calls Party B and Party B is not available. As is well known, Party A's call is redirected to the messaging system 200. The I/O module 204 of the speech to X module 202 records Party A's message in step 304 and then forwards the message to the SRM 210 in step 308. The SRM 210 then converts the message to a format such as text that is recognized by the SXCM 212 in step 312. The SRM 210 then forwards the message in this new, recognized format to the SXCM 212 in step 316.

In one embodiment, the SXCM 212 receives the message in its new format and interacts with the supporting module 228 in step 320. The SXCM 212 communicates with the supporting module 228 to, for instance, obtain rules, content, etc. that the SXCM 212 may use for its processing of the message in the new format.

The SXCM then converts the message in its recognizable format to an X format, such as a multimedia format or control logic such as an XML document or a Java Applet, in step 324. The SXCM 212 then stores the original message and X format message in the storage module 216.

Figure 4:
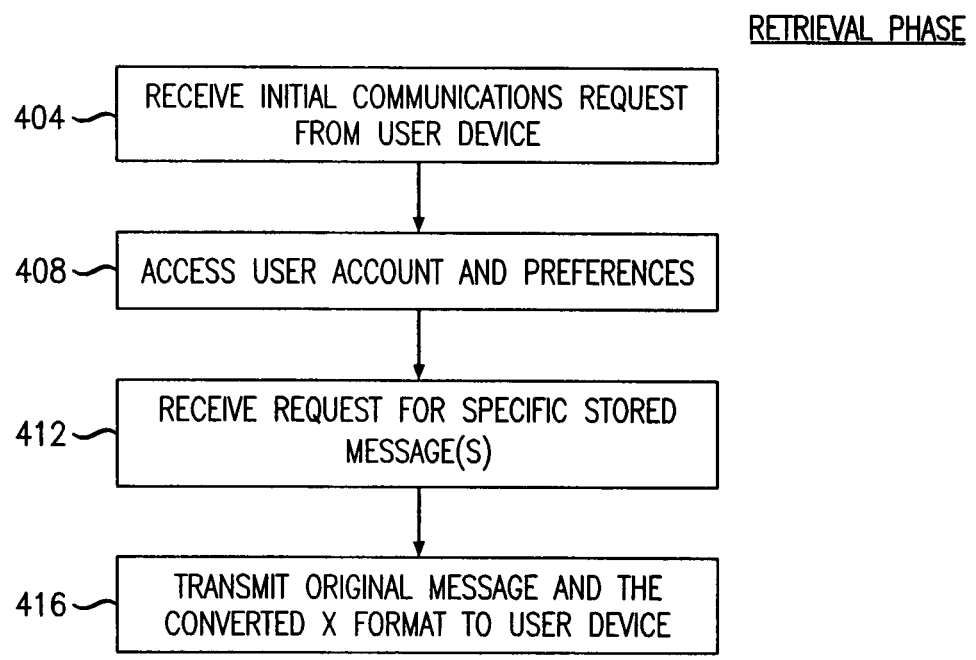
FIG. 4 is a flowchart illustrating the steps performed during a retrieval phase by a messaging system in accordance with an embodiment of the present invention.

FIG. 4 shows a flowchart of the steps performed by the speech to X module 202 when a user wants to retrieve a message, i.e., the Retrieval Phase. The speech to X module 202 receives an initial communications request from a user's device to initiate a communication session with the messaging system 200 in step 404. The speech to X module 202, for example the SXCM 212, may then interact with the supporting module 228 to access user account and preferences, network policies, device capabilities, etc.

The I/O module 204 then receives a request from the user device for specific stored message(s) in step 412. The I/O module 204 transmits the original message and the converted X format message 240 to the user device in step 416. In one embodiment, the converted X format message is of a format that is specific for the user device. Thus, the output of the speech to X module 202 can be tailored to the user device that is requesting the message. In one embodiment, the converted X format message is a web page that is referred to in the original message. The user device receives the original message and the converted X format message 240 and executes the control logic with the recorded message.

As described above, the execution of the control logic may occur at a predetermined time. The predetermined time can be associated with the content of the message. For example, the execution of the control logic may be synchronized with the playing or display of the content of the message. Thus, when the playing or displaying of the message gets up to a point where the additional content is referenced, the control logic may then be executed so that the additional content is retrieved and displayed/played at the time when it is referenced in the original message.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for supplying information comprising:
   storing, by a messaging system, a message from a calling party to a called party, the messaging system being a voice mail server configured to store voice mail messages, and the message being at least one of the voice mail messages stored on the messaging system;
   determining content of at least a portion of the message stored in the messaging system;
   retrieving additional information based on said content, wherein the additional information is not included in the content and the additional information is retrieved via an external information source based on the determined content;
   formatting the additional information in a format supported by a user device associated with the called party, in response to the user device requesting the additional information; and
   transmitting said message and said additional information to the user device.

2. The method of claim 1, further comprising:
   converting said at least a portion of said message into a format that is recognized by said messaging system.

3. The method of claim 1, further comprising:
   converting said at least a portion of said message into a format associated with said user device.

4. The method of claim 1, further comprising: determining the capabilities of said user device.

5. The method of claim 1, further comprising:
   determining user preferences.

6. The method of claim 1, further comprising:
   configuring said message and said additional information such that said additional information is utilized by said user device at a time, said time related to said content of said message.

7. A messaging system for transmitting information comprising:
   means for storing, by the messaging system, a message from a calling party to a called party, the messaging system being a voice mail server configured to store voice mail messages, and the message being at least one of the voice mail messages stored on the messaging system;

means for determining content of at least a portion of the stored message in the messaging system;

means for retrieving additional information based on said content, wherein the additional information is not included in the content and the additional information is retrieved via an external information source based on the determined content;

means for formatting the additional information in a format supported by a user device associated with the called party, in response to the user device requesting the additional information; and means for transmitting said message and said additional information to the user device.

8. The messaging system of claim 7, wherein said content comprises:
a uniform resource locator (URL).

9. The messaging system of claim 7, wherein said content comprises:
at least one of a physical address and a location.

10. The messaging system of claim 7, wherein said content comprises:
at least one of a company name and an individual's name.

11. The messaging system of claim 7, wherein said additional information comprises:
at least one of a map, contact information, a web page, a URL, a location, an address, a picture, a photograph, and a video.

12. The messaging system of claim 7, further comprising:
means for converting said message into a format that is recognized by said messaging system.

13. The messaging system of claim 7, further comprising:
means for determining the capabilities of said user device.

14. The messaging system of claim 7, further comprising:
means for determining user preferences.

15. The messaging system of claim 7, further comprising:
means for configuring said message and said additional information such that said additional information is utilized by said user device at a time, said time related to said content of said message.

16. A non-transitory computer readable medium comprising computer program instructions capable of being executed in a processor and defining the steps comprising:
storing, by a messaging system, a message from a calling party to a called party, the messaging system being a voice mail server configured to store voice mail messages, and the message being at least one of the voice mail messages stored on the messaging system;

determining content of at least a portion of tje message stored in the messaging system;

retrieving additional information based on said content, wherein the additional information is not included in the content and the additional information is retrieved via an external information source based on the determined content;

formatting the additional information in a format supported by a user device associated with the called party, in response to the user device requesting the additional information; and transmitting said message and said additional information to the user device.

17. A messaging system for transmitting information comprising:
a memory configured to store a message from a calling party to a called party, the messaging system being a voice mail server configured to store voice mail messages, and the message being at least one of the voice mail messages stored on the messaging system;

a speech recognition module configured to determine content of at least a portion of the message stored in the memory;

a speech to X conversion module configured to,
retrieve additional information based on said content, wherein the additional information is not included in the content and the additional information is retrieved via an external information source based on the determined content, and format the additional information in a format supported by a user device associated with the called party, in response to the user device requesting the additional information; and an input output module configured to transmit said message and said additional information to the user device.

18. The messaging system of claim 17, further comprising:
a storage module configured to store said message and said additional information.

19. The messaging system of claim 17, wherein said speech to X conversion module is configured to configure said message and said additional information such that said additional information is utilized by said user device at a time, said time related to said content of said message.

20. The messaging system of claim 17 wherein said additional information comprises at least one of a map, contact information, a web page, a URL, a location, an address, a picture, a photograph, and a video.

* * * * *